United States Patent
Salsbury

(10) Patent No.: US 6,647,318 B2
(45) Date of Patent: Nov. 11, 2003

(54) PULSE MODULATION ADAPTIVE CONTROL METHOD FOR ACTIVATING AN ELECTRICAL DEVICE

(75) Inventor: Timothy I. Salsbury, Milwaukee, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 80 days.

(21) Appl. No.: 10/040,069

(22) Filed: Nov. 7, 2001

(65) Prior Publication Data
US 2002/0116075 A1 Aug. 22, 2002

Related U.S. Application Data

(63) Continuation-in-part of application No. 09/708,815, filed on Nov. 8, 2000.

(51) Int. Cl.[7] .......................... G01M 1/38; G05B 13/00
(52) U.S. Cl. ............................................. 700/276
(58) Field of Search ................................ 700/276, 278, 700/299, 300, 41, 34, 54; 236/1 C, 91 D, 78 D, 1 E; 165/267–269

(56) References Cited

U.S. PATENT DOCUMENTS

| | | | | |
|---|---|---|---|---|
| 4,759,498 A | * | 7/1988 | Levine et al. ............. 236/46 R |
| 4,799,176 A | * | 1/1989 | Cacciatore ................. 700/278 |
| 5,115,968 A | * | 5/1992 | Grald ....................... 236/78 D |
| 5,369,597 A | * | 11/1994 | Bujak, Jr. .................. 700/276 |
| 5,915,473 A | * | 6/1999 | Ganesh et al. ............. 165/222 |
| 6,252,209 B1 | * | 6/2001 | Liepold ..................... 219/501 |

* cited by examiner

Primary Examiner—Leo Picard
Assistant Examiner—Ryan Jarrett
(74) Attorney, Agent, or Firm—Foley & Lardner

(57) ABSTRACT

A facility management system includes a device which produces a change of an environmental characteristic in a building. A method for operating the device involves sensing the environmental characteristic to provide a measured value, and defining a desired maximum amplitude of variation within which the measured value may vary. A control signal is produced in response to the difference between the measured value and a desired value for the environmental characteristic. The control signal is then used to produce an output signal that turns the device on and off, wherein the output signal has a cycle period during which a pulse of a given duration occurs. The cycle period and the given duration are varied in response to the control signal without permitting the measured value to deviate more than desired.

20 Claims, 2 Drawing Sheets

PULSE MODULATION ADAPTIVE CONTROL METHOD FOR ACTIVATING AN ELECTRICAL DEVICE

CROSS-REFERENCE TO RELATED PATENT APPLICATIONS

This application is a continuation-in-part of U.S. application Ser. No. 09/708,815, filed Nov. 8, 2000, which is hereby incorporated by reference in its entirety.

BACKGROUND OF THE INVENTION

The present invention relates to systems which control equipment, such as heating, ventilation and air conditioning equipment; and more particularly to controlling devices that have discrete states, e.g., on and off, and to control algorithms that pulse-width modulate the operation of the devices.

FIG. 1 conceptually illustrates a typical heating, ventilation and air conditioning (HVAC) system 10 for controlling the environment of a room 12. Air from the room is drawn by fan 15 into a return duct 14 from which some of the air flows through a damper 16 to a supply duct 18. Some of the return air may be exhausted to the outside of the building through an outlet damper 20 and replenished by fresh outside air entering through an inlet damper 22. The dampers are opened and closed by actuators that are operated by a controller 24. Air in the supply duct 16 flows through a direct expansion cooling coil 25 before being fed into the room 12. Temperature sensors 26 and 27 measure the air temperature in the supply duct 18 and the room 12, respectively, and provide signals to the controller 24. A fluid circulates through the cooling coil 25, then flows outside the building to a condenser coil 28 and through a compressor 29 before being returned to the cooling coil.

A heating coil 21 also is provided and selectively receives heated water from a boiler when the room environment needs to be warmed.

Many components of an HVAC system have only two operational states: on and off. Room temperature control based on a thermostat switching a heating or cooling device is an example of such on/off control. Whenever the thermostat indicates that the temperature of the room needs to be adjusted, the only choice is to turn on the heating or cooling device to full capacity regardless of the degree to which the room temperature varies from the desired level. Thus, the device applies the same amount of heating or cooling to the room regardless of the deviation from the desired temperature point, the only difference being how long the heating or cooling device must operate before the desired temperature is achieved. Often, the full operation of the HVAC system provides more heating or cooling than is required which results in the room temperature overshooting the desired value and producing a significant temperature deviation in the opposite direction.

In an attempt to improve control resolution, multiple on/off devices are often grouped together and operated in various combinations and sequences. For example, there may be multiple compressor stages 30, with the number of them which are active at any given time being determined by the cooling load requirements of the room.

A generic problem with controlling on/off devices, such as compressors, whether single or multiple stages, is that loads falling between the maximum and minimum capacities cannot normally be met exactly in steady state. The result is that controllers need to switch on and off continuously in an effort to meet the setpoint. Such cycling on and off taxes the components and can lead to premature failure.

SUMMARY OF THE INVENTION

The present invention relates to a method for controlling a device of a facility management system wherein the device controls an operational parameter of a building, such as temperature for example. This control method employs pulse-width, pulse-frequency modulation (PWPFM) so that the duration of the controlled device's on-time and the cycling frequency are varied in response to the load. This pulse-width, pulse-frequency control strategy is adaptive and has application to devices that are unable to be switched at requisitely high frequencies due to physical limitations and potential equipment wear.

The method senses the regulated operational parameter to provide a measured value. The desired amplitude of the variation in the measured value D is defined by the user. A pulsed output signal h, produced in response to a control signal u, turns the device on and off. The output signal has a cycle period C during which a pulse of a given duration occurs. The cycle period and the given duration are varied in response to the control signal so that the amplitude of variation in the measured value is limited to no greater than the desired value D when the system is in a steady state pulsing condition.

Versions of this control strategy are described for the control of single and multiple stage devices.

The control method adapts to changes in the gain of the controlled process to ensure performance according to the specified value D.

DETAILED DESCRIPTION OF THE PREFERRED EMBODIMENTS

Figure 1:
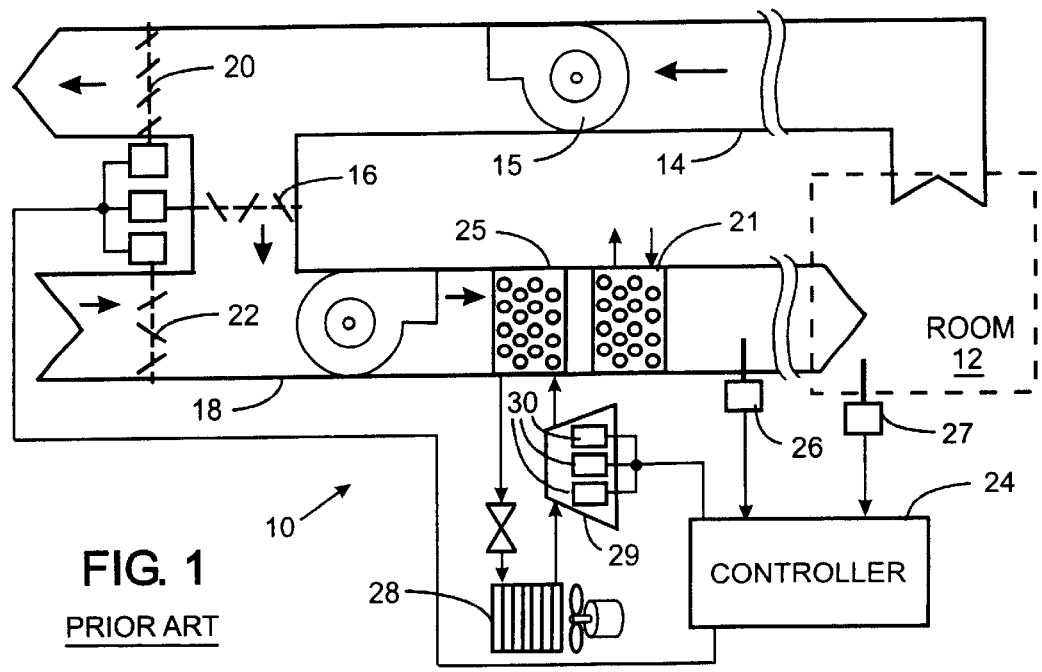
FIG. 1 is a diagram of a conventional HVAC system.
Figure 2:
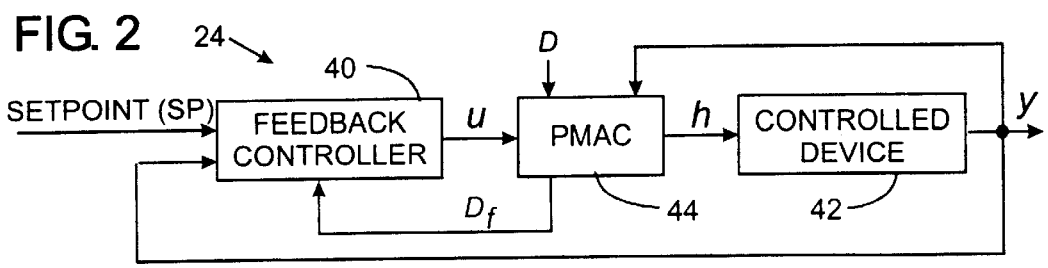
FIG. 2 is a block schematic diagram of one embodiment of the control method according to the present invention.

The present invention is implemented utilizing a controller 24 for the compressor 29 in the HVAC system 10 of FIG. 1. The configuration of the controller 24, shown in FIG. 2, includes a feedback controller 40 which produces an analog control signal u in response to a deviation of the controlled process variable y from a desired setpoint SP. In the exemplary HVAC system, the process variable y is the actual measured value of an environmental characteristic (e.g., the temperature of a room, as measured by the temperature sensor 27) and the setpoint SP designates the desired room temperature. The feedback controller 40 is of conventional design and may be a proportional integral (PI) type device such as the one disclosed in U.S. Pat. No. 5,506,768.

Figure 3:
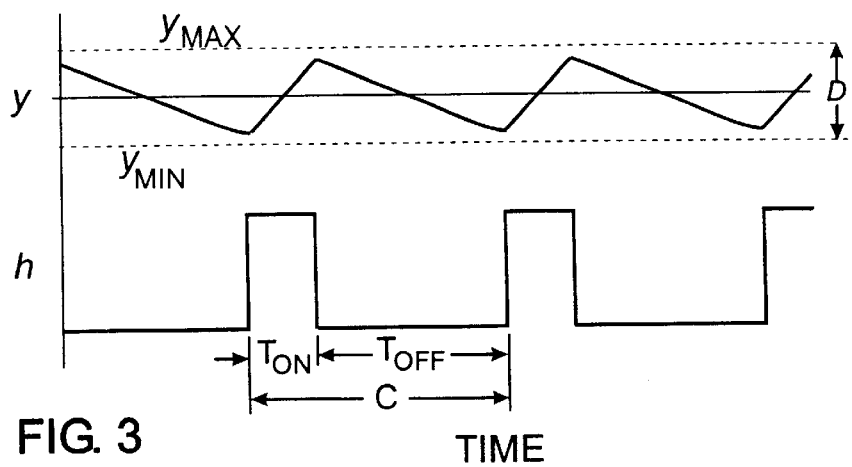
FIG. 3 graphically depicts a relationship between the on/off control of a device and variation of the environmental characteristic that is being regulated.

The control signal u has values between zero and one, inclusive, in response to the inputs to the feedback controller 40. The value of control signal u provides a relative indication of the magnitude (0% to 100%) that the controlled device 42 (e.g., a single stage compressor 29) needs to be operated at in order to bring the room temperature to the desired level. For a system that can be modulated, this control signal u is applied directly to a driver for the controlled device 42, which produces the change in the room temperature. In the exemplary HVAC system, by contrast, the control signal u is applied to a pulse modulation adaptive controller (PMAC) 44 positioned intermediate the feedback controller 40 and the driver for the controlled device 42. The PMAC 44 responds to the control signal u by producing a pulsed output signal h (i.e., a sequence, in time, of on and off epochs) that turns the controlled device 42 on and off. As shown in FIG. 3, output signal h has a cycle period C and an on-time $T_{ON}$ which is a fraction of the total cycle period. Both the cycle period and the on-time are functions of the control signal u, as will be described below.

The control signal u also indicates the fractional load on the control system. Conventional control strategies utilizing pulse width modulation meet fractional load requirements by changing the portion of a fixed cycle period during which the device is switched on. The greater the fraction of the on-time, the greater the average output of the device being controlled. The controlled devices have a minimum on-time and a minimum off-time. For example, an air conditioning system must remain off for a minimum period of time so that pressures within the system can reach equilibrium before the compressor is restarted. The minimum on and off times are set by the manufacturer of the controlled device. In order to achieve the greatest degree of control, the on-time should vary throughout the maximum allowable range of values, where the maximum on-time value is the cycle time minus the minimum off-time for the controlled device. Assuming a cycle time C, the on-time $T_{ON}$ is given by the expression:

$$T_{ON} = C \left\{ u \left[ 1 - \frac{1}{C_{MAX}} (T_{MIN,ON} + T_{MIN,OFF}) \right] + \frac{T_{MIN,ON}}{C_{MAX}} \right\} \quad (1)$$

where $T_{MIN,ON}$ is the minimum on-time, u is the control signal from the feedback controller, C is the total cycle period such that $C=T_{ON}+T_{OFF}$, $T_{MIN,OFF}$ is the minimum off-time, and $C_{MAX}$ is the maximum cycle period as defined by the user.

In addition to ensuring a wide controllable range, another important factor from a control perspective is the variation of the system output (e.g., temperature) in response to the switching induced from the pulse train of the output signal h. Each time the controlled device 42 switches from one state to another, the controlled parameter (process variable y) responds according to dynamics of the overall process. For example, see FIG. 3 which shows the variation in amplitude of the measured process variable y as the controlled device is switched on and off in response to the output signal h when in a steady state pulsing condition. If the duration of on and off states is small relative to the dominant time constant τ of the device being controlled, the variation in the process variable y about its mean will also be small. Conversely, the variation about the mean will be large for long cycle periods C. Hence, the cycle period C directly affects any realizable setpoint tracking performance.

In HVAC systems that require on/off control, the process is usually dominated by a long time constant τ. In the exemplary HVAC system, it may take several minutes for a commanded change in the control of the HVAC system to produce the desired temperature change in the room. Thus, the present invention postulates a first-order characterization of the HVAC system.

With the present pulse modulation adaptive control technique, the user specifies a required variation in the system output, i.e., the D value. With a specified D value (i.e., with a constant amplitude of variation in a steady state pulsing condition), the cycle period required to achieve this value as a function of the on time $T_{ON}$ can be calculated. The following relationship can be used to determine the cycle period that yields a constant amplitude of variation in the assumed first order system:

$$C = -\tau \ln \left[ \frac{(D/G) - 1 + e^{\frac{-Ton}{\tau}}}{(D/G) + 1 - e^{\frac{Ton}{\tau}}} \right] \quad (2)$$

where G is the process gain.

As noted above, the present pulse modulation adaptive control technique varies the cycle period C as a function of the control signal u to meet predefined output variation requirements in addition to ensuring a predefined range in the mean value of the controlled signal in a steady state pulsing condition. More specifically, the cycle period C is maximized for a given control signal u and a desired amplitude of variation of the process variable y, i.e., the maximum deviation amount D, also referred to as the "tolerance level." This method is optimal in the sense that it provides the least amount of device switching that still allows the selected tolerance level to be maintained.

The maximum amplitude of variation D is determined by the particular process variable, i.e., environmental characteristic, being controlled. In the case of an HVAC system, the room temperature may vary 1° F. above or below the setpoint without producing complaints from the building occupants. A smaller tolerance range, while producing more accurate control of the room environment, will place a greater work load on the equipment. FIG. 3 illustrates how the pulse width modulated output signal h produces a variation of the controlled process variable y. Conversely, the magnitude by which the output signal h can be varied in the pulse width modulation scheme is impacted by limiting the maximum variation of the controlled process variable y.

Equation (1) provides one function for calculating the on-time $T_{ON}$, and equation (2) provides one function for calculating the cycle time C. Thus, the cycle period can be derived by combining equations (1) and (2) and letting $e^{-C/\tau}=x$ to produce the following expression in which f(x) is defined as:

$$f(x) = a_1 + a_2 x - x^{ur+k} + x^{1-ur-k} \quad (3)$$

where $a_1 = 1 - D/G, a_2 = 1 + D/G,$ $r = 1 - \frac{1}{C_{MAX}} (T_{MIN,ON} + T_{MIN,OFF})$, and $k = \frac{T_{MIN,ON}}{C_{MAX}}.$ The symbol r relates to the effective controllable range. Equation (3) enables the cycle period C to be determined by solving for f(x)=0 and then calculating C from C=−τ ln(x). These calculations for the cycle time C and the device on-time $T_{ON}$ are performed every time a set of temperature samples are acquired by the control system 10.

Equation (3) cannot be solved analytically, and thus an iterative process is required. Any of several root finding algorithms may be employed in the process, however, the false position (secant) method is particularly well suited to this application.

The effective controllable range r is inversely related to the cycle time in that there are diminishing improvements in the controllable range to be achieved by increasing the cycle time. The basic philosophy of the control strategy is that the controllable range should remain constant irrespective of the maximum amplitude of variation D selected for the process variable y.

Figure 4:
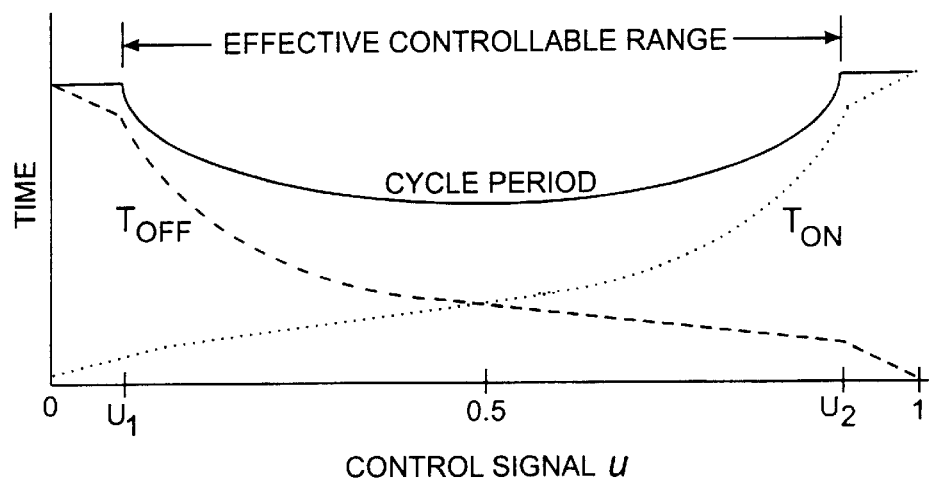
FIG. 4 depicts the relationship between the operation of the controlled device and a control signal produced by a controller according to the present invention.

By enforcing this constraint, the cycle time C is fixed at the extremities of the control signal range, i.e., at u=1 and u=0. As illustrated in FIG. 4, the cycle time C is set to a maximum value $C_{MAX}$, as defined by the user, for values of the control signal u that are less than $U_1$ or greater than $U_2$. This graph shows the variation in the cycle time C and the on and off times $T_{ON}$ and $T_{OFF}$, respectively, as a function of the control signal u produced by the feedback controller 40.

Thus, the PMAC 44 responds to the control signal u by deriving the on-time $T_{ON}$ and the cycle period C for operating the controlled device 42. These two variables change with the control signal u and with changes in the room environment being controlled. Thus, the duration that the controlled device 42 is active and the frequency at which that device is turned on are dynamically varied.

As noted previously, control of the on-time $T_{ON}$ and the cycle period C are limited so that the variation of the process variable y is within a reasonably tolerated maximum deviation D, such as ±1° F. for an HVAC system. To specify a value for the desirable amplitude of variation D for the process variable (e.g., temperature of the room) under control, the process gain G must be at least approximately known.

Since knowledge of the process gain G is not always available and since the gain may change at different operating points, it is desirable to implement an automated procedure for selecting an appropriate value for G. One way to do this is to establish the gain by observing the actual variation in the process variable for a particular instigated value of D/G such that:

$$G = \frac{(\Delta y)\hat{G}}{D} \tag{4}$$

where $\hat{G}$ is an initial guess for the process gain and $(\Delta y)$ is the actual variation in the process variable y for an applied value of D. Thus, $$(\Delta y)_j = f(D/\hat{G}_j) \tag{5}$$

$$\hat{G}_{j+1} = \frac{(\Delta y)_j \hat{G}_j}{D} \tag{6}$$

where f(.) is a function/procedure that evaluates the actual variation in the controlled variable and the subscript j is an estimate number. Assuming the time constant estimate used in the PMAC algorithm is correct and the considered system is first-order, equation (6) will correctly estimate the gain G to yield a variation in the process variable equivalent to D. As the dynamics of the real system deviate from the first-order form assumed in the present invention, the gain estimate will take longer to converge on an appropriate value. In this case, jacketing methods familiar to those of skill in the art could be introduced to improve the convergence of the gain estimation, e.g., by limiting the permissible change in gain from one estimate to another.

Implementing equation (6) requires a procedure for estimating the actual variation in the process variable y over one cycle. This change may be evaluated by simply monitoring the maximum and minimum values of the process variable y over one cycle epoch:

$$(\Delta y)_j = (y_{MAX} - y_{MIN}) \tag{7}$$

where the subscript j denotes a cycle epoch, $y_{MAX}$ is the maximum value of the process variable y, and $y_{MIN}$ is the minimum value of the process variable y. Note that the process should be ensured to be operating within its controllable range by only estimating the gain when the control signal is not saturated at either end of its range.

When the control signal u is not in steady-state, the gain will be overestimated resulting in a faster cycle period. Once in steady-state, the process variable y oscillates at a smaller amount than the desired amplitude D until the correct gain G is estimated. The amplitude of variation in the process variable y thus approaches the desired value as the process reaches a steady-state pulsing condition.

The achievable amplitude of variation in the process variable y may be different than the desired value D in certain parts of the range of the command signal due to the implementation of constraints. Although the PMAC method ensures that the specified value of D is not exceeded, the applied pulses may result in a smaller actual variation. Therefore, the achievable $\overline{D}$ value is calculated from the applied pulse duration and cycle period over the same period used to evaluate the change in the environmental characteristic process variable y:

$$\overline{D}_j = \left(\frac{1}{N}\sum_{i=1}^{N} D_i\right)_j \tag{8}$$

where N is the number of samples that are acquired during the considered interval. The applied D value is calculated from the following equation using the cycle period and on-time calculated at each sample in the PMAC algorithm:

$$D_i = \left[\frac{1-e^{-\frac{(T_{ON})_i}{\tau}}}{1-e^{-\frac{C_i}{\tau}}}\right]\left(1-e^{\frac{(T_{ON})_i - C_i}{\tau}}\right)\hat{G}_j \tag{9}$$

Equation (6) then can be rewritten as:

$$\hat{G}_{j+1} = \frac{(\Delta y)_j \hat{G}_j}{\overline{D}_j} \tag{10}$$

The HVAC system described thus far employed a single stage compressor 29. The present control strategy also may be applied to multi-stage devices. For those devices, the controller 24 is modified to select the number of stages to activate fully with another stage being controlled to satisfy the remaining portion of the demand. Depending upon the amount of cooling required to bring the temperature in room 12 to the desired setpoint temperature, the controller 24 may activate one or more of the compressor stages 30 to their full capacity while controlling another one of the compressor stages 30 using the pulse width modulation technique of the present invention. As described previously, the pulse width modulation technique differs from prior PWM control methods in that both the on-time of the device and the cycle period are dynamically varied to meet the load demand of the system.

Figure 5:
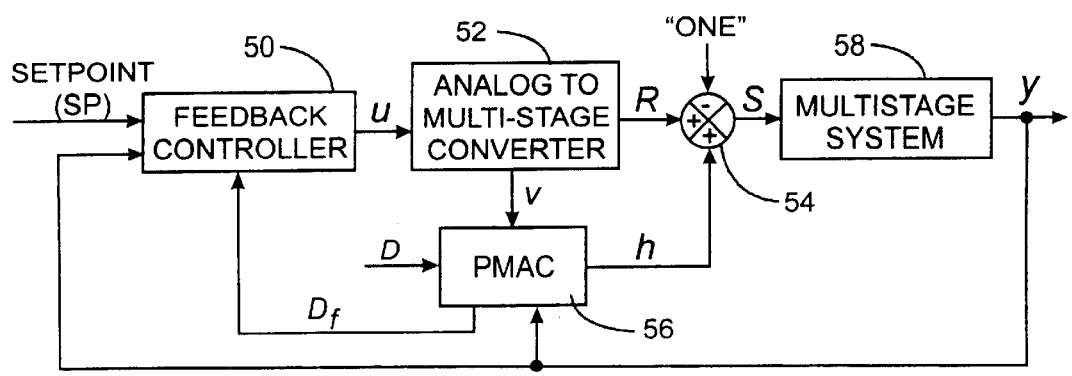
FIG. 5 is a block schematic diagram of a second embodiment of a controller that implements this invention.

For multi-stage apparatuses, the controller 24 has the configuration as shown in FIG. 5 and includes a feedback controller 50 that is the same as feedback controller 40 previously described. The control signal u produced by the feedback controller 40 has values between zero and one, inclusive, to provide a relative indication of the magnitude (0% to 100%) that the control device 42 (e.g., compressor 29) needs to be operated at in order to bring the controlled process variable (e.g., room temperature) to the desired level.

Figure 6:
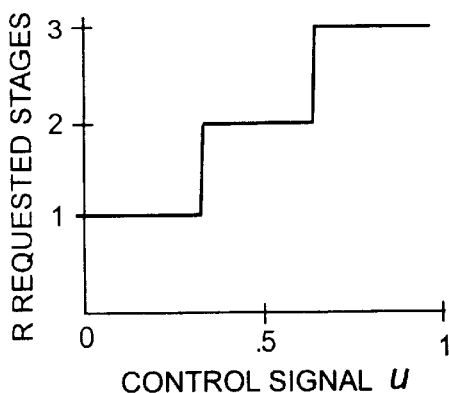
FIG. 6 shows the relationship between a control signal and the requested number of stages pertinent to a multi-stage application of the present invention.
Figure 7:
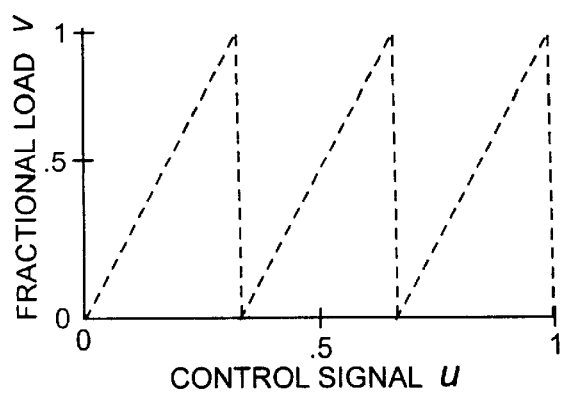
FIG. 7 shows the relationship between the control signal and a split range signal for a multi-stage application.

The control signal u is sent to an analog to multi-stage converter 52 which determines the number of stages R that should be operated to full capacity and the fractional amount of full capacity that another stage needs to operate at as designated by the fractional load signal v. The signal v indicates the fractional load which is unable to be met by a discrete number of stages and is sometimes referred to as a "vernier" signal. The number of requested stages R is calculated by dividing the control signal into equal parts as shown below:

$$R = f(Nu+1) \text{ where } 1 \leq R \leq N \quad (11)$$

$$v = Nu - R + 1 \text{ where } 0 \leq v \leq 1 \quad (12)$$

where f(.) is a function that rounds down its input to the nearest integer. FIG. 6 shows how the number of requested stages R relates to the control signal u, and FIG. 7 shows a similar relationship for the fractional load signal v.

Referring again to FIG. 5, the signal indicating the number of requested stages R is sent from the multi-stage converter 52 to a summing node 54. The fractional load signal v is applied as an input to a pulse modulation adaptive controller (PMAC) 56 of the same design as the PMAC 44 whose functionality was described previously. The PMAC 56 in the multi-stage embodiment employs the fractional load signal v in place of the control signal u in the single stage embodiment. A signal D designating a desired value for the maximum tolerated variation of the process variable y is also applied as an input to the PMAC 56.

The PMAC 56 produces a pulsed output signal h that turns on and off another stage of the multi-stage apparatus 58, such as compressor 29. Both the cycle period C and the on-time $T_{ON}$ of that additional stage are varied in response to the fractional load signal v and the desired variation D, in the same manner as described above with respect to the single stage embodiment. The pulsed output signal h from the PMAC 56 is applied to another input of the summing node 54, which also receives the signal R and another signal corresponding to the numerical value one. The summing node combines these input signals to produce an output signal S according to the expression: S=R+h−1 with the output S being applied to the control input of the multistage apparatus and determining the number of stages that are active at any given point in time.

As shown in FIG. 5, the PMAC 56 generates a signal $D_f$ which is passed back to the feedback controller 50 in closed loop fashion. The feedback controller 50 uses the $D_f$ value to define a deadband around the controller setpoint SP. The reason for the deadband is that, when in closed loop, the fluctuations in the controlled variable brought about by the PMAC generated pulse train h will cause the controller 50 to issue an output u that will also fluctuate. It is desirable to reduce the sensitivity of the feedback controller 50 to the output variations induced by the PMAC 56, but at the same time ensure that the feedback controller 50 responds to other errors. This can be accomplished by incorporating a deadband in the controller 50 that results in the error, as seen by the controller 50, to be set to zero whenever it is below the deadband value $D_f$. Assuming the requested deadband is not too small, the actual value will always be equal to or less than that requested.

As persons skilled in the art will appreciate, the foregoing description provides a novel type of switching control law (PMAC) that implements a form of pulse-width-pulse-frequency modulation. The PMAC control strategy is based on variation of cycling frequency in addition to pulse width to reduce switching of the controlled device and hence reduce wear. More specifically, the PMAC strategy is designed so that the user is able to specify the desired amplitude of variation D in the controlled variable y. Similar to conventional PWM control, the PMAC control algorithm issues pulses to a controlled process enabling control of an analog process output variable by means of an analog control signal. In contrast to PWM control, however, the PMAC algorithm does not require specification of a cycling frequency, but instead determines this dynamically from the specified amplitude of variation D. The PMAC strategy adjusts the switching frequency as a function of the demanded control input and adapts to changes in the gain G of the system to maintain controlled variable perturbations equal to or below the specified level across the range of operation. The strategy provides minimal switching for the selected control performance The foregoing description was primarily directed to a preferred embodiment of the invention. Although some attention was given to various alternatives within the scope of the invention, it is anticipated that one skilled in the art likely will realize additional alternatives that are now apparent from disclosure of embodiments of the invention. For example, this invention can be applied to other environmental characteristics than temperature and to controlling other types of discrete stage equipment in the management of a building. Accordingly, the scope of the invention should be determined from the following claims and not limited by the above disclosure.

What is claimed is:

1. A method for controlling a device of a facility management system, wherein the device controls an operational parameter of a building, said method comprising:

receiving a control signal (u) representative of a deviation in magnitude between a measured value of the operational parameter and a desired value of the operational parameter;

defining a desired maximum amplitude of variation (D) for the measured value; and producing a pulsed output signal (h) that turns the device on and off, wherein the pulsed output signal is a pulse-width, pulse-frequency modulated signal having a cycle period during which a pulse of a given duration (TON) occurs, the cycle period and the given duration being dynamically calculated in response to changes in the control signal to maximize the cycle period while maintaining the amplitude of variation of the measured value equal to or below the maximum amplitude of variation (D) when the system is in a steady state pulsing condition.

2. The method of claim 1, further including sensing the operational parameter to provide the measured value.

3. The method of claim 1, wherein the maximum amplitude of variation (D) is defined as a constant value.

4. The method of claim 1, wherein the control signal (u) is an analog signal.

5. The method of claim 1, wherein the device has a plurality of stages and the producing step comprises responding to the control signal by:

determining, in response to the control signal (u), a number of stages (R) that are to operate at full capacity; and determining, in response to the control signal (u), a fractional amount (v) of full capacity that another stage is to operate at, wherein the fractional amount is employed to determine the cycle period and the given duration.

6. A method for controlling a device of a facility management system, the device producing a change of an environmental characteristic in a building, said method comprising:

specifying a desired value for the environmental characteristic;

defining a desired maximum amplitude of variation (D) in the measured value;

receiving a control signal (u) representative of a deviation of a measured value from the desired value for the environmental characteristic; and producing a pulse train (h) that controls turning on and off the device, the pulse train being a pulse-width, pulse-frequency modulated signal having a cycle period during which occurs a pulse of a given duration ($T_{ON}$), wherein the cycle period and the given duration are dynamically varied in response to the control signal so that the cycle period is maximized while an amplitude of variation of the measured value is maintained no greater than the maximum amplitude of variation (D) when the system is in a steady state pulsing condition.

7. The method of claim 6, wherein the device is turned on in response to an occurrence of a pulse in pulse train.

8. The method of claim 6, wherein the cycle period C is varied according to the expression:

$$C = -\tau \ln \left[ \frac{(D/G) - 1 + e^{-\frac{Ton}{\tau}}}{(D/G) + 1 - e^{\frac{Ton}{\tau}}} \right]$$

where $\tau$ is a time constant of the device and G is the process gain.

9. The method of claim 6, wherein the given duration TON is varied according to the expression:

$$T_{ON} = C \left\{ u \left[ 1 - \frac{1}{C_{MAX}} (T_{MIN,ON} + T_{MIN,OFF}) \right] + \frac{T_{MIN,ON}}{C_{MAX}} \right\}$$

where C is the cycle period, $T_{MIN,ON}$ is a minimum amount of time that the device should be turned on, and $T_{MIN,OFF}$ is a minimum amount of time that the device should be turned off.

10. The method of claim 6, wherein the maximum amplitude of variation (D) is defined as a constant value.

11. The method of claim 6, wherein the control signal (u) is an analog signal.

12. The method of claim 6, wherein defining the maximum amplitude of variation (D) utilizes the expression:

$$\hat{G}_{j+1} = \frac{(\Delta y)_i \hat{G}_j}{D_j}$$

where $\Delta y$ is a change in the measured value and G is a gain of the process for changing the environmental characteristic in the building.

13. The method of claim 6, wherein the device has a plurality of stages, the method further comprising:

determining, in response to the control signal (u), a number of stages (R) that are to operate at full capacity; and determining, in response to the control signal (u), a fractional amount (v) of full capacity that another stage is to operate at, wherein the fractional amount is employed to determine the cycle period and the given duration.

14. A method for controlling a device of a facility management system, wherein the device has a plurality of stages and produces a change of an environmental characteristic in a building, the method comprising:

specifying a desired value for the environmental characteristic;

defining a desired maximum amplitude of variation (D) within which the measured value is permitted to vary;

receiving a control signal (u) representative of a difference in magnitude between a measured value for the environmental characteristic and the desired value for the environmental characteristic;

determining, in response to the control signal (u), a number of first stages (R) that are to operate at full capacity;

determining, in response to the control signal (u), a fractional amount (v) of full capacity that a second stage is to operate at; and producing a pulsed output signal (h) that controls turning on and off of the second state, wherein the output signal is a pulse-width, pulse-frequency modulated signal having a cycle period during which a pulse of a given duration occurs, the cycle period and the given duration of the pulse being varied in response to the fractional amount (v) so that the cycle period is maximized while variation of the measured value is maintained no greater than the maximum amplitude of variation D when the system is in a steady state pulsing condition.

15. The method of claim 14, wherein the maximum amplitude of variation (D) is defined as a constant value.

16. The method of claim 14, wherein defining the maximum amplitude of variation (D) varies the value of the maximum amplitude of variation amount in response to changes in performance of the device in controlling the operational parameter.

17. An apparatus for controlling a device of a facility management system, wherein the device controls an operational parameter of a building, comprising:

means for receiving a control signal (u) representative of a deviation in magnitude between a measured value of the operational parameter and a desired value of the operational parameter;

means for defining a desired maximum amplitude of variation (D) for the measured value; and means for producing a pulsed output signal (h) that turns the device on and off, wherein the output signal is a pulse-width, pulse-frequency modulated signal having a cycle period during which a pulse of a given duration ($T_{ON}$) occurs, the cycle period and the given duration of the pulse being dynamically calculated in response to changes in the control signal to maximize the cycle period while maintaining the amplitude of variation of the measured value equal to or below the maximum amplitude of variation (D) when the system is in a steady state pulsing condition.

18. The apparatus of claim 17, further including means for sensing the measured value.

19. The apparatus of claim 17, wherein the cycle period C is varied according to the expression:

$$C = -\tau \ln\left[\frac{(D/G) - 1 + e^{\frac{-Ton}{\tau}}}{(D/G) + 1 - e^{\frac{Ton}{\tau}}}\right]$$

where $\tau$ is a time constant of the device and G is the process gain.

20. The apparatus of claim 17, wherein the given duration $T_{ON}$ is varied according to the expression:

$$T_{ON} = C\left\{u\left[1 - \frac{1}{C_{MAX}}(T_{MIN,ON} + T_{MIN,OFF})\right] + \frac{T_{MIN,ON}}{C_{MAX}}\right\}$$

where C is the cycle period, $T_{MIN,ON}$ is a minimum amount of time that the device should be turned on, and $T_{MIN,OFF}$ is a minimum amount of time that the device should be turned off.

* * * * *